United States Patent
Kelsey

(10) Patent No.: US 7,239,411 B2
(45) Date of Patent: Jul. 3, 2007

(54) METHOD AND APPARATUS FOR CONTROLLING PRINTING OF ELECTRONIC APPLICATIONS

(75) Inventor: Todd Mark Kelsey, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1016 days.

(21) Appl. No.: 09/955,232

(22) Filed: Sep. 18, 2001

(65) Prior Publication Data

US 2003/0053102 A1    Mar. 20, 2003

(51) Int. Cl.
G06F 15/00 (2006.01)

(52) U.S. Cl. .................. 358/1.15; 358/1.1; 358/1.2; 358/1.6; 358/1.9; 358/1.12; 358/1.13; 358/452; 358/501

(58) Field of Classification Search ............ 358/1.15, 358/1.19, 1.13, 1.1, 1.2, 1.6, 1.9, 1.12, 452, 358/501, 14
See application file for complete search history.

(56) References Cited

U.S. PATENT DOCUMENTS 5,200,816 A * 4/1993 Rose .................. 358/518
6,373,586 B1 * 4/2002 Kim .................. 358/1.15
6,707,568 B1 * 3/2004 Yu .................. 358/1.15
2002/0065871 A1 * 5/2002 Wakai et al. ............ 709/202
2003/0011801 A1 * 1/2003 Simpson et al. .......... 358/1.13

* cited by examiner

Primary Examiner—Twyler Lamb
Assistant Examiner—Vu Hang
(74) Attorney, Agent, or Firm—Patterson & Sheridan

(57) ABSTRACT

A method and apparatus for controlling printable content from textual and graphical sources, and reducing consumable print medium such as toner, ink, and paper. The method and apparatus includes a print medium formatting program for configuring data identification options and print options via at least one graphical user interface (GUI) generated by a print option formatting module. The configured data identification options and print options are then stored in one or more print configuration data files. A print monitoring module monitors for a print request. The print medium formatting program intercepts the print request and matches data identification from a spooled print file, which is generated from the print request, with the stored data identification options. If the print medium formatting program finds a match, a transforming program module transforms the spooled print file in accordance to the print options, and then prints the transformed print file to an output device.

23 Claims, 7 Drawing Sheets

METHOD AND APPARATUS FOR CONTROLLING PRINTING OF ELECTRONIC APPLICATIONS

FIELD OF THE INVENTION

The invention relates to computer software. More specifically, the invention relates to a method and apparatus for controlling printable subject matter.

BACKGROUND OF THE INVENTION

Today's user interfaces are increasingly graphic-intensive. For example, Internet browsers are used to view web sites, which are becoming heavily augmented with supplementary graphics, such as advertisements, banners, pictures, and the like. When an individual who is "surfing the web" selects a frame on a web page to be printed, the current Internet browsers print the entire frame, including all of the content (i.e., text, graphics, and the like) therein. In many instances, the user is not interested in all of the contents shown on the web page. Therefore, the user may be inundated with undesirable content.

Furthermore, there are extraneous financial and time costs for printing undesirable content such as graphics. For example, the printing of graphics on a web page takes additional time, as well as utilizing extra paper and toner or ink from the printer to complete the print job.

The impact of printing undesirable content is considerable. For example, in the year 2000, there were an estimated 219 million ink jet printers and 200 million laser printers worldwide. Revenues for ink jet cartridges are expected to continue at a double-digit growth rate for the next five years. Moreover, revenues in the year 2000 for ink jet cartridges were $13.9B, while $8.5B for toner cartridges. As usage of the Internet and graphical interfaces grows worldwide, the printing of such undesired content becomes a wasteful consumption of the print medium materials, such as ink cartridges, toner cartridges, paper, and the like, which increases the overall costs of printing.

Therefore, there is a need in the art for a method and apparatus for controlling printable content from web pages and other graphic intensive subject matter.

SUMMARY OF THE INVENTION

Provided are a method and apparatus for controlling printable content and reducing consumable print medium such as toner, ink, and paper. The method and apparatus include a print medium formatting program for configuring data identification options and print options via at least one graphical user interface (GUI) generated by a print option formatting module. The configured data identification options and print options are then stored in a print configuration data file. A print monitoring module of the print medium formatting program monitors for a print request. The print medium formatting program intercepts the print request and matches data identification from a spooled print file, which is generated by the print request, with the stored data identification options. If the print medium formatting program finds a match, a transforming program module transforms the spooled print file in accordance to the print options, and then prints the transformed print file to an output device.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
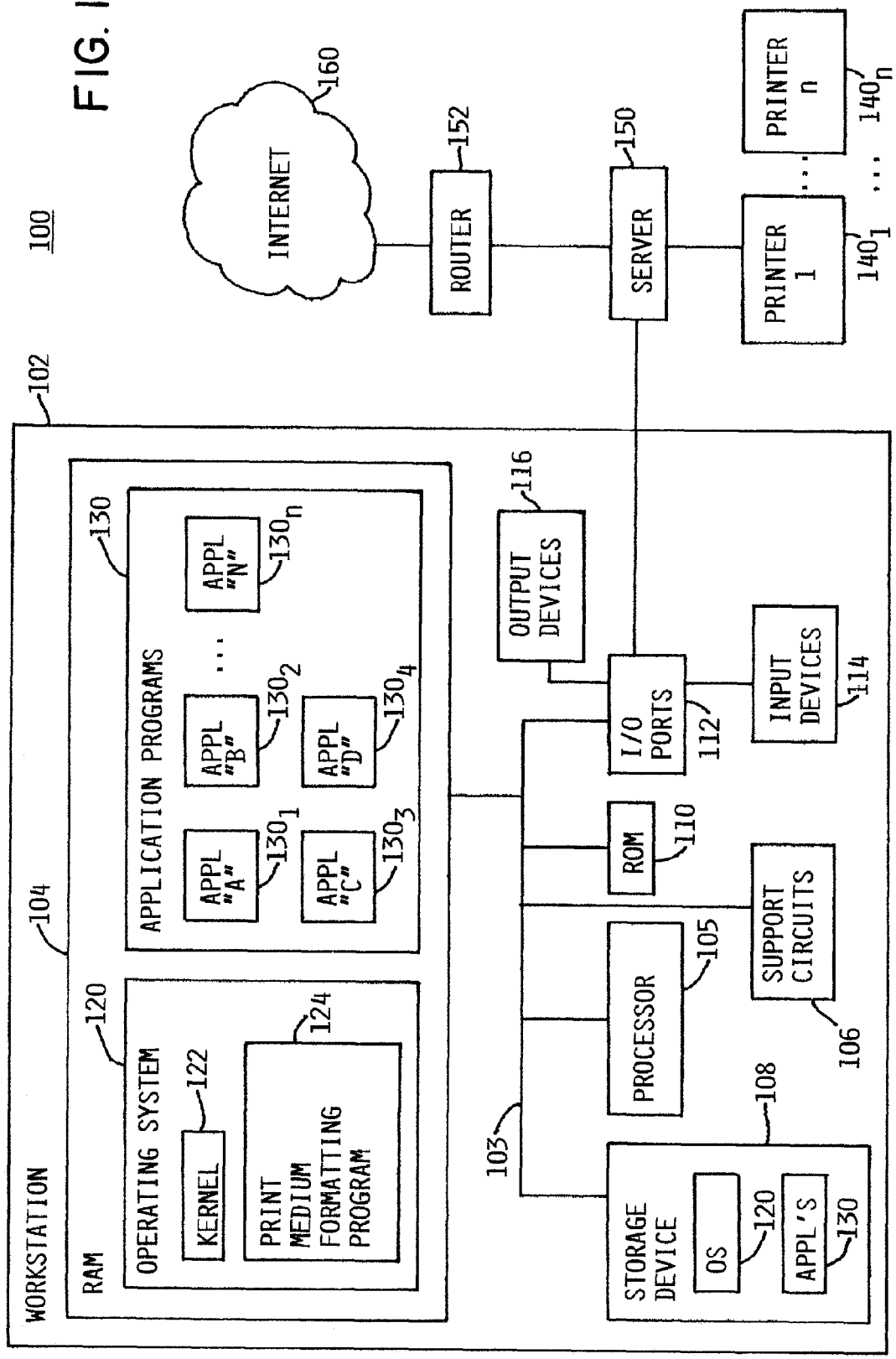
FIG. 1 depicts a block diagram of a computer system in accordance with the present invention.

The present invention relates to a method and apparatus for controlling printable content on a computer system based upon user defined printing formats. Specifically, a print software program operates in conjunction with a computer system's operating system and/or application programs to monitor print requests, intercept a spooled print file generated from the print request, and then control the content that is printed in accordance with the user defined printing formats. That is, the print software program operates in tandem with the operating system, application programs, and/or any print drivers that exist on a computer device. In one embodiment of the invention, a print medium formatting program permits a user to specify particular output devices, application programs, and the like for which the present invention is applied. Furthermore, a user is provided with the capability to specify the subject matter (e.g., text, graphics, headers, advertisements, and the like) illustratively shown on a web page, which is to be printed output. Moreover, the print medium formatting program monitors print requests and transforms the print data stream in accordance with the criteria specified by the user. Although the present invention is discussed in terms of web pages, it should be understood that the invention is also applicable for any type of software that integrates content illustratively containing graphics, text, and other distinctive features together, and should not be considered as limiting. One such type of software program may illustratively be a software program that allows a user to create and edit photographs, such as PHOTOSHOP® and the like.

As described in detail herein, aspects of the preferred embodiment pertain to specific method steps that are implemented on computer systems. In an alternative embodiment, the invention may be implemented as a computer software product for use with a computer system. The programs of the software product define the functions of the preferred embodiment and may be delivered to a computer via a variety of signal-bearing media, which include, but are not limited to, (a) information permanently stored on nonwritable storage media (e.g., read-only memory devices within a computer such as CD-ROM disks readable by CD-ROM drive); (b) alterable information stored on writable storage media (e.g., floppy disks within diskette drive or hard-disk drive 114); or (c) information conveyed to a computer by a communications medium, such as through a computer or telephone network, including wireless communications. Such signal-bearing media, when carrying computer-readable instructions that direct the functions of the present invention, represent alternative embodiments of the present invention. Alternate embodiments may include implementation of the inventive print software program as an application program stored on the computer, as program code stored in a device driver or on an output device itself, or on a network device such as a server or firewall, as discussed in further detail below.

FIG. 1 depicts a communications network 100 in accordance with the present invention. In one embodiment, the communications network 100 comprises at least one workstation 102 illustratively coupled to the Internet 160 through a server 150 and a router or firewall 152. Furthermore, one or more output devices 140$_1$ through 140$_n$ (collectively output devices 140) are coupled to the workstation 102 via the server 150.

The output devices 140 may include printing devices such as laser jets, ink jets, dot matrix printers, copiers, scanners, or any other output device, which reproduces an image (e.g., text, graphics, pictures and the like) using a consumable reproduction medium. For purposes herein, consumable reproduction medium includes materials, which are consumed during the operation of reproducing an image such as toner, ink cartridges, ink coated ribbons, paper, and the like. Furthermore, for purposes of better understanding the invention, the output devices 140 is discussed hereinafter in terms of a "printer", although such terminology is not considered as limiting.

In one embodiment of the invention, the communications network 100 may be a local area network or wide area network LAN/WAN having each node coupled together by wiring such as ETHERNET cabling, or alternately by wireless communications illustratively operating under the "Bluetooth", IEEE 802.11 family standards, Open Air industry standards, Shared Wireless Access Protocol (SWAP), and HiperLAN family standards, which are hereby incorporated by reference herein. For example, both the Bluetooth and the 802.11 standards provide for wireless technology that supports both point-to-point and point-to-multipoint connections. In an alternate embodiment (not shown), the workstation 102 may be coupled to the Internet via a modem, direct service line (DSL), and the like (not shown), without interfacing with a server 150. Specifically, the one or more printers 140 are coupled to and controlled by the workstation 102 directly.

Additionally, in one embodiment of the invention, the workstation 102 may be a desktop computer; however, a person skilled in the art will recognize that a laptop computer, server, hand-held device, and the like may alternately be utilized. The workstation 102 comprises at least one system interconnect, e.g., bus 103, to which various components are coupled and communicate with each other. Specifically, a processor 105, storage device 108, memory such as random access memory (RAM) 104, read only memory (ROM) 110, input/output (I/O) ports 112, and other support circuits 106 are coupled to the system bus 103. Furthermore, one or more output devices 116, such as a display, as well as one or more input devices 114 such as a keyboard and/or pointing device are respectively coupled to the I/O ports 112. The input and output devices 114 and 116 permit user interaction with the workstation 102.

The processor 105 sends and receives information to and from each of the workstation components coupled to the system bus 103 and performs system operations based upon the requirements of the workstation's operating system 120 and application programs 130 that are installed thereon. The processor 105 may be an Intel PENTIUM® type microprocessor, an IBM Power PC® processor, or the like.

The ROM 110 typically includes a Basic Input-Output System (BIOS) program, which controls basic hardware operations such as the interaction of the microprocessor 105 with the keyboard/mouse input device 114, hard disk 108, or video display 116, and the like. The storage device 108 is a permanent storage medium such as a hard disk, CD-ROM, tape, or the like, which stores the operating system 120 and applications programs 130.

The RAM 104 is volatile memory (e.g., SRAM, DRAM, MRAM and the like). The contents of the RAM 104 may be retrieved from the storage device 108 as required. Illustratively, the RAM 104 is shown with the operating system 120 and application programs 130 "A" through "N" concurrently stored therein. The program code of the operating system 120 and/or application programs 130 is sent to the RAM 104 for temporary storage and subsequent execution by the processor 105.

The I/O port 112 includes various controllers (not shown) for each input device 114 such as a keyboard, mouse, joystick, and the like, as well as the output devices 116 such as an Ethernet network adapter, infrared device and display (not shown). Typically, other support circuits 106 include controllers for the storage device 108, floppy drive, graphics display, and the like (not shown).

The operating system (OS) 120 may illustratively be any one of Microsoft's WINDOWS® operating systems, or any other operating system 120 that provides graphical user interfaces (GUI) for user interaction. The operating system 120 is capable of interfacing with all of the hardware components of the workstation 102. The applications programs 130 are specialized programs such as a word processing programs, spreadsheets, web browsers, and the like. The executable and library files (not shown) of the operating system 120 and application programs 130 are individually transferred from the storage device 108 to the RAM 104 for processing as needed. The transfer of the executable files may be controlled by a memory management system such as on-demand paging. A page is a fixed amount of data that is sent to the RAM 104 for subsequent execution by the microprocessor 105. The RAM 104 may simultaneously store a plurality of pages of data to accommodate various files being processed by the operating system 120 and application programs 130 that are concurrently running. Thus, the RAM 104 is capable of storing files from the operating system 120, as well as files from one or more applications programs 130$_1$ through 130$_n$ (collectively applications programs 130).

In order to oversee the execution of all the files opened, a kernel 122 is stored in the RAM 104. The kernel is a central module of the operating system that is initially loaded into the RAM 104. The kernel 122 is installed at dedicated addresses in the RAM 104 and is responsible for memory management, process and task management, and disk management. The kernel 122 manages one or more files that are open during the course of operation.

A print medium formatting program 124 is illustratively stored at the workstation 102. For purposes of clarity and understanding the invention, the print medium format program 124 is discussed as being incorporated as part of the operating system 120. As such, upon "boot-up" of the workstation 102, the print medium formatting program 124 is loaded into the RAM 104 along with other executable files (not shown) of the operating system 120.

However, in a second embodiment, the print medium formatting program 124 may be implemented as a separate and distinct application program 130, and is loaded into the RAM 104 upon user activation of such application program. In a third embodiment, the print medium formatting program 124 may be program code incorporated into one or more device drivers. In this third embodiment, the print medium formatting program 124 is activated only when a specific device driver (e.g. a printer device driver) is utilized by the operating system 120. In a fourth embodiment, the print medium formatting program 124 is loaded onto the individual output devices 140. For example, typically a printer or copier has firmware, which provides some intelligence to the device. In this fourth embodiment, a user may key in specific key sequences to activate and utilize the print medium formatting program 124 or send a command to the printer via a printer interface program. Furthermore, in yet another embodiment of the invention, the print medium formatting program 124 may be alternately stored on the network (e.g., the server 150, a firewall program, and the like) for shared applications, illustratively, in a client/server relationship.

Figure 2:
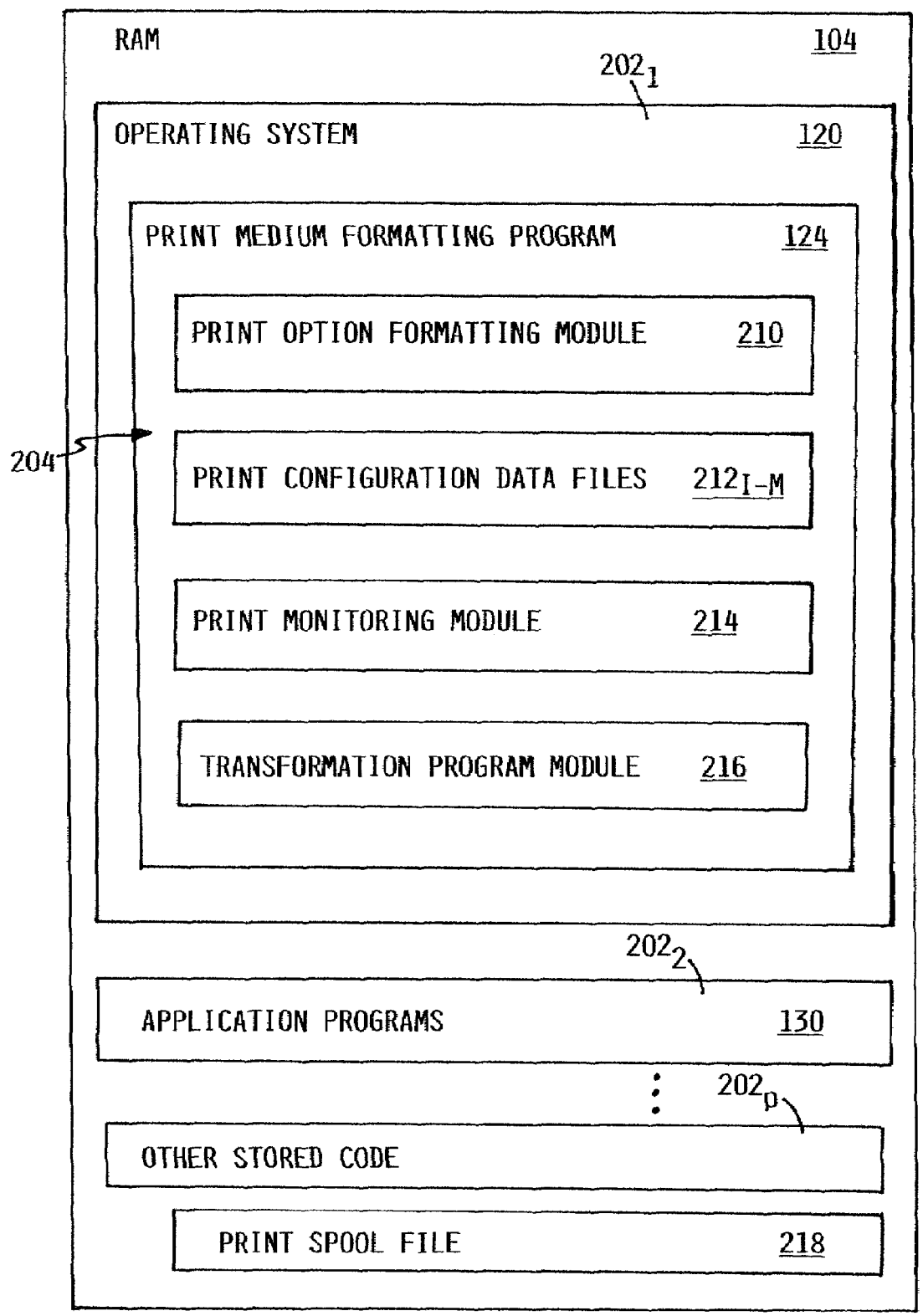
FIG. 2 depicts a detailed block diagram further depicting a print medium formatting program in the RAM in FIG. 1.

FIG. 2 depicts a detailed block diagram 200 further depicting the contents in the RAM 104 in FIG. 1. In particular, the RAM 104 is divided into memory portions $202_n$, where a first memory portion $202_1$ stores the operating system 120, a second memory portion $202_2$ stores the application programs $130_1$ through $130_n$, and other memory portions $202_n$, which store other program code (e.g., boot record, system files, and the like), as required. As shown in FIGS. 1 and 2, the print medium formatting program 124 is illustratively a part of the operating system 120. The print medium formatting program 124 illustratively comprises four program modules 204, which provide different features and functionality.

The four program modules 204 comprise a print option formatting module 210, one or more print configuration data files $212_1$ through $212_m$, a print monitoring module 214, and a transformation program module 216. The print option formatting module 210 generates graphical user interfaces (GUIs) to permit a user to configure the settings of the print medium formatting program 124. The one or more print configuration data files $212_1$ through $212_m$ are files that permanently store the configuration for the print medium formatting program 124. The print monitoring module 214 provides a method for monitoring print requests and initiating the print medium formatting program 124. Furthermore, the transformation program module 216 transforms a spooled print file 218 in accordance with the configuration settings stored in the print configuration data files 212. The program modules 204 selectively interact with each other when executed as discussed below, and together provide the controllable printing formatting capabilities of the present invention.

Figure 3:
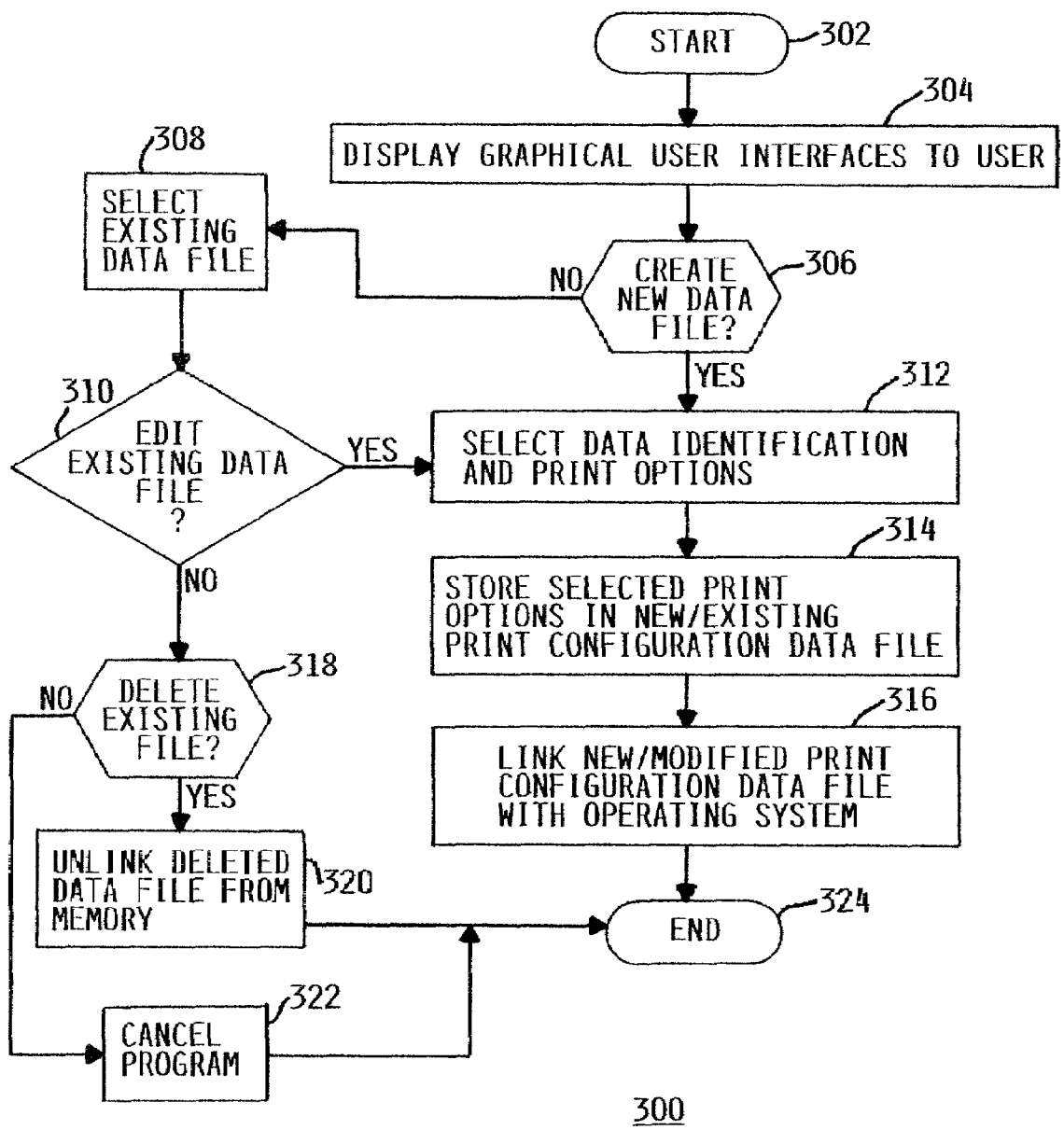
FIG. 3 depicts a flowchart of a method for configuring the print medium formatting program of the present invention.

FIG. 3 depicts a flowchart of a method 300 for configuring the print medium formatting program 124 of the present invention. Generally, the method 300 presents a user with a graphical user interface (i.e., pop-up window) that allows the user to either create a new print configuration data file 212, or edit or delete an existing print configuration data file 212. Although method 300 is discussed in terms of utilizing a graphical user interface, in another embodiment, a user may interface with the program via other user interfaces, such as a command line interface and the like. Once the user selects and saves the print options presented in the GUI, the currently selected print configuration data file 212 is linked to, illustratively, the operating system. The operating system 120, in conjunction with the print medium formatting program 124, then monitors the selected print options in the print configuration data files 212 for a user print request and subsequent application, as discussed below with regard to method 600 presented in FIG. 6. For a detailed understanding of configuring the print medium formatting program 124, the method 300 should be viewed in conjunction with FIGS. 2, 4, and 5 as discussed below.

Figure 4:
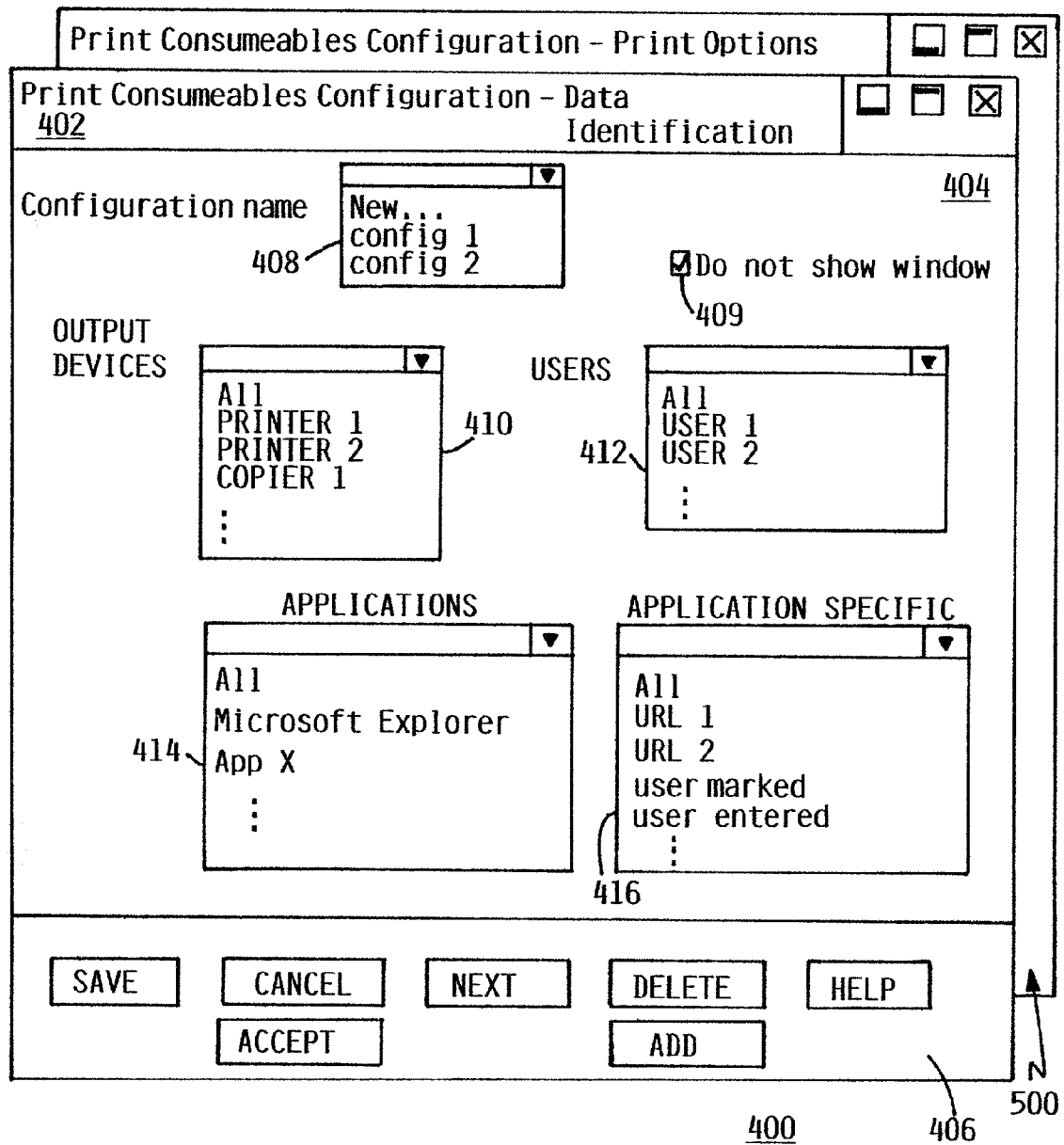
FIG. 4 depicts a first graphical user interface for configuring the print medium formatting program of FIG. 3.
Figure 5:
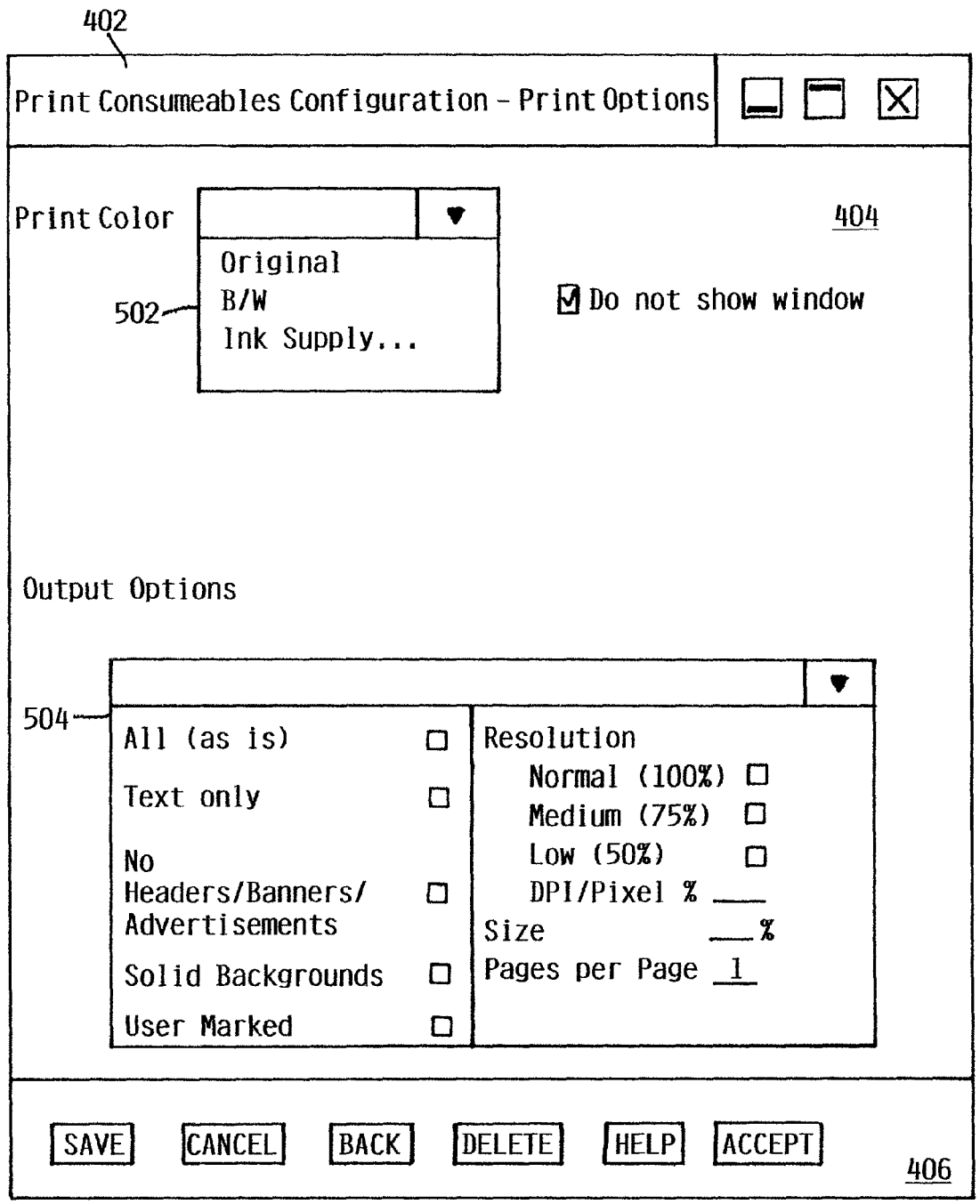
FIG. 5 depicts a second graphical user interface for applying the print medium formatting program of FIG. 3.

The method 300 starts in step 302, where a user has booted up the workstation 102, and proceeds to step 304. Portions of the operating system 120, including print medium formatting program 124 are loaded from the storage device 108 into the RAM 104 for subsequent execution by the processor 105. In one embodiment, the print medium formatting program 124 is executed upon each print request made by a user. In other embodiments, the print medium formatting program 124 may be executed by pressing a series of "hot-keys", clicking on an icon, and the like. In step 304, the print option formatting module 210 generates one or more graphical user interfaces (GUIs) as a pop-up screen for user interaction. The print option formatting module 210 is program code capable of creating one or more graphical user interfaces, which permit a user to configure and save various printing options in an existing or new configuration data file 212. FIGS. 4 and 5 illustratively depict one embodiment of such GUIs. In particular, FIG. 4 depicts a first GUI 400 for applying data identification options of the present invention for various mediums. Additionally, FIG. 5 illustratively depicts a second GUI 500 for applying particular print options to the various mediums selected in the first GUI of FIG. 4.

Referring to FIG. 4, the first GUI 400 provides a user with the capability to configure various parameters in the print medium formatting program 124. In particular, the first GUI 400 is displayed on top of (i.e., over) any currently displayed operating system and/or application program. Each graphical user interfaces (e.g., GUI 400) is activated by execution of the print option formatting module 210 of the print medium formatting program 124.

The first GUI 400 illustratively comprises a header 402, an information field 404, and a control bar 406. The header 402 identifies the title of the first GUI (i.e., pop-up window) 400 and has view control buttons for illustratively closing, reducing, and enlarging the pop-up window. The information field 404 is the main body of the first GUI 400 and contains multiple data fields illustratively framed by scrollable sub-windows, which contain selectable data identification options. In one embodiment, the user may select options (e.g., highlight, mouse click, check, and the like) from a list provided to the user. Alternately, the user may enter various options by typing such options in a command line (not shown) on the GUI 400. One exemplary data field containing a selectable data identification option is a configuration name field 408, which allows the user to select a print configuration data file 212 in accordance with step 304 of method 300.

In step 306, the user determines whether a new print configuration data file 212 is to be created. If the user determines that a new print configuration data file 212 is not required, then the method proceeds to step 308, where the user selects an existing print configuration data file 212. The method 300 then proceeds to step 310, where the user makes a second determination. In step 310, the user determines whether to edit an existing print configuration data file. If, in step 310, the determination is answered positively, the method proceeds to step 312, where the user is shown the data identification and print options saved under that selected configuration, as well as other available print options from which the user may choose.

For example, referring to FIG. 4, if the user selects configuration 2 in the configuration name field 408, the user is illustratively presented with four additional sub-windows, such as a device sub-window 410, a users sub-window 412, an applications sub-window 414, and an application specific sub-window 416. The devices sub-window 410 presents the user with a listing of available output devices 140 for which the present invention is applied and the user is authorized to access. Such output devices 140 illustratively include one or more printers, copiers, scanners, and the like. The user may optionally select one or more output devices 140, or all of the devices 140.

The users sub-window 412 is applicable when the workstation 102 is part of the communications network 100. As such, the users sub-window 412 presents the user with the option of selecting, for example, from a list, all or some of the users, for which the present invention is applicable. Furthermore, the list may be limited by the user's security authorizations.

Additionally, the user is presented with a listing of the applications programs 130 in the applications sub-window 414. The user may then select particular application programs 130, for which the present invention is to be applied. For example, the user may select one or more individual application programs 130, such as Microsoft's EXPLORER® and/or the NETSCAPE® browser, PHOTOSHOP®, and the like.

Furthermore, by selecting from the application specific sub-window 416 the user may configure specific data. For example, most notable web browsers provide viewer history features, which allow a user to select from a listing of temporarily, saved uniform resource locators (URLs) during a current session, or permanently saved "bookmarked" URLs. As such, the application specific sub-window 416 illustratively permits a user to select or enter particular URL's for which the present invention is applied.

The user highlights the desired data identification options (by keystroke, mouse clicking, and the like) in each sub-window 410, 412, 414, and 416, and then saves the selected options in the print configuration data file 212. In particular, the user clicks on a "SAVE" button located in the control bar 406 below the information field 404. Other control bar buttons located in the control bar 406 may include an "ACCEPT" button, a "CANCEL" button, a "NEXT" button, an "ADD" button, a "DELETE" button, a "HELP" button, and the like. Such buttons are well known in the art and are discussed herein only for purposes of completeness.

In one embodiment, additional print options may be viewed by clicking on the "NEXT" button. In particular, the print option formatting module 210 generates a second GUI for presentation to the user. FIG. 5 illustratively depicts the second GUI 500 for applying particular print options to the various mediums selected in the first GUI of FIG. 4. In particular, the second GUI 500 comprises a header 402, an information field 404, and a control bar 406 as discussed above with regard to the first GUI 400. The second GUI 500 is utilized to specify particular options to the output device (i.e., printer, copier, and the like).

In the illustrative embodiment of FIG. 5, the information field 404 is shown having a print color sub-window 502 and an output options sub-window 504. The print color sub-window 502 provides the user with a listing of printing options such as "ORIGINAL", "B/W" (black and white only), and "Ink Supply." The ORIGINAL option allows the user to print, for example, the contents of a web page 'as is', including all of the colored graphics and text as shown in a browser on the display screen. The B/W option allows a user to print the displayed web page only in black and white, as opposed to using colored inks.

Additionally, the Ink Supply option permits a user to print the displayed web page in any color or colors, dependent on the supply of ink remaining in the ink cartridge. For example, many color printer models, such as the HP2000C printer model by Hewlett-Packard, monitor the ink levels in the cartridges. Accordingly, the Ink Supply option illustratively selects particular ink color cartridges having high ink levels for printing, as opposed to those color ink cartridges, which are running low. This feature allows for more uniform consumption of the colored ink, thereby reducing the likelihood that one particular color (e.g., blue) may be consumed much sooner than the rest of the colored inks in the printer 140. For example, a user who consumes all of the black ink in a multi-ink well cartridge has the capability to reproduce a "simulated" black color from the remaining colored ink wells in the cartridge. This alleviates the wasteful practice of throwing out a single cartridge having multi-colored ink wells because one or a few of the colors have been consumed, while the remaining colors are still available for consumption, but are used less often.

Referring to FIG. 5, the output options sub-window 504 permits the user to select portions of an exemplary web page, resolution, and other print options. In one embodiment, the user may illustratively select the entire web page document "as is." Alternately, the user may select only the text, or the web page without the headers/banners/advertisements, or disregard any solid colored background areas, and/or the like. Additionally, the user may select portions of the web page by highlighting such desired portions with a mouse or other input device. As such, the above mentioned options described in FIGS. 4 and 5 permit a user to reduce the printable content according to such users requirements and reduces the consumption of the consumable printing medium such as toner cartridges, ink cartridges, ink coated ribbons, paper, and the like.

Furthermore, the output options 504 preferably include resolution settings, such that the resolution of the printed or copied subject matter may be reduced from 100% to either a medium or low setting, or some specific setting measured by dots-per-inch (DPI). For example, if a user illustratively checks off the "Solid Background" option and specifies 50% in the DPI setting, then a normally dark shade solid background would be printed at a lighter shade of the same color, thereby reducing the amount of ink or toner consumed. Additional cost savings as described above may be provided through the present invention by reducing the size of the image by some selectable percentage, as well as printing more than one illustrative web page on a single page in combination with the aforementioned output formatting options Referring to FIG. 3, the method 300, and specifically step 306, if the first determination by the user, which is to create a new print configuration data file 212, is answered affirmatively, then the method proceeds to step 312, as discussed above with regard to editing an existing print configuration data file 212 in step 310. That is, the first and second GUI's of step 304, as illustratively shown in FIGS. 4 and 5, are presented to the user for selecting data identification and print options. Once the user has selected the data identification and print options in step 312, the user saves the selected information. Specifically, in step 314, the selected new or edited (i.e., current) print configuration data file 212 is saved with the selections made in a permanent print configuration data file, which is deemed currently active. In step 316, the current print configuration data file 212 is illustratively linked with the operating system as the print configuration data file 212 that is to be actively accessed and read, as opposed to other existing print configuration data files 212 that are stored on the workstation 102. Once the saved print configuration data file 212 is stored in step 314 and then made current in step 316, the method 300 ends in step 322.

Method 300 also depicts steps to delete an existing print configuration. The user may in step 310 edit such print configuration data file 212, or alternately, in step 318, delete the existing print configuration data file 212. The deletion is made by first highlighting the selected print configuration data file 212 in step 308. In step 320, illustratively pressing the DELETE button in the control bar 406 of the first GUI 400 permanently deletes the selected print configuration data file 212 from memory. That is, the deleted file is unlinked from memory and will not be displayed again as an existing configuration data file 212 in future GUI presentations. Alternately, if the user does not create a new configuration data file, or edit or delete and existing configuration data file, the user, in step 322, may cancel the print medium formatting program 124 by illustratively pressing the CANCEL button in the control bar 406 of the first GUI 400. The method 300 then ends in step 324. Moreover, it should be noted that although step 306 is discussed as occurring first in method 300, one skilled in the art will recognize that once at least one print configuration data file 212 exists, editing an existing data file (i.e., step 310) or deleting an existing data file (i.e., step 318) may alternately be performed prior to creating a new data file (i.e., step 306). As such, method 300 provides a user with one or more GUIs to identify and select the type of data (e.g., output devices, users, application, and the like) the print medium formatting program 124 is to operate upon. Furthermore, the method allows a user to select the particular features to reduce the consumption of consumable print mediums (i.e., ink and toner) by the selected output devices (e.g., printers, scanners, copiers, and the like).

Referring to FIG. 2, the print monitoring module 214 enables the print medium formatting program 124 to monitor print requests from the selected data references (e.g., the devices 410, the applications 414, and the like in FIG. 4). Furthermore, the print monitoring module 214 compares data identification and print options from a spooled print file created from the print request with saved data identification and print options in the current print configuration data file 212. Moreover, the transformation program module 216 transforms the exemplary web page to be printed in accordance with the printer options selected in FIG. 5, which were saved in the current print configuration data file 212.

Figure 6:
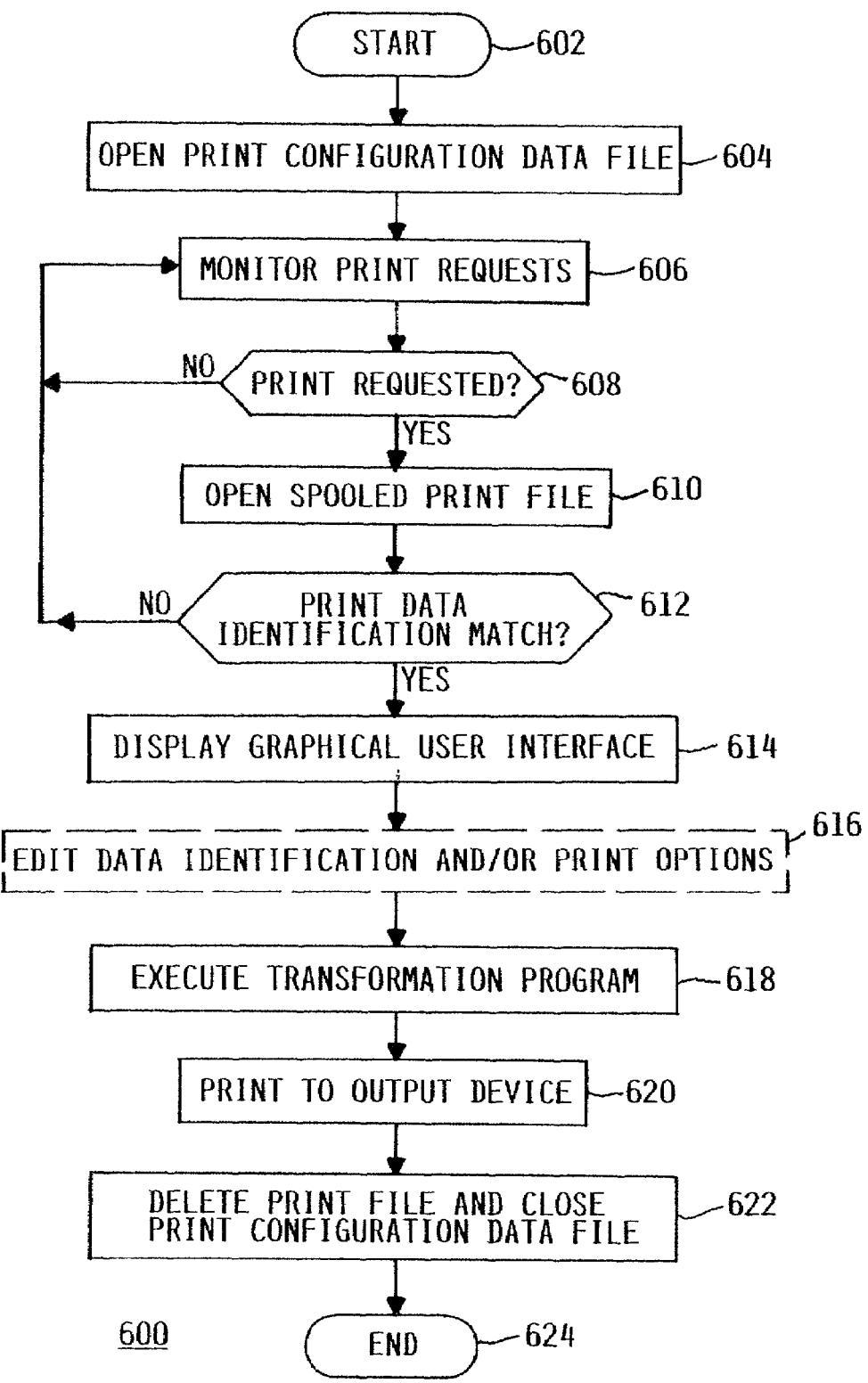
FIG. 6 depicts a flowchart of a method for controlling printable content from textual and graphical sources using the print medium formatting program of the present invention.

FIG. 6 depicts a flowchart of a method 600 for controlling printable content from textual and graphical sources using the print medium formatting program 124 of the present invention. The method 600 starts in step 602 where the workstation 102 is turned on and the operating system 120 including the print medium formatting program 124 is loaded from the storage device 108 into the RAM 104. That is, the print medium formatting program 124 is illustratively loaded at start up of an operating system, such as during the start-up of a WINDOWS® type of operating system. In an alternate embodiment, the user may load the print medium formatting program 124 from an executable program (e.g., an application program, device driver, and the like).

In step 604, the current print configuration data file 212 of the print medium formatting program 124 is opened. Recall that in the exemplary embodiment of FIG. 1, the print medium formatting program 124 is installed in the operating system 120 on the workstation 102. However, as discussed above, the print medium formatting program 124 may also be loaded on one or more output devices 140 such as a printer, a copier, on a device driver as a separate and distinct application program 130 loaded into the RAM 104, or on a server 150 or firewall on the network 100. In any of these embodiments, the print configuration data file 212 is opened and then the print medium formatting program 124 monitors for print requests by intercepting the interrupt generated by the print request. In one embodiment, the latest saved print configuration data file 212 is opened. In other embodiments, the last used, or a default print configuration data file 212 may be initially opened.

In step 606, the print medium formatting program 124 monitors for print requests by the user. A user initiates a print request by, for example, clicking on the print feature in an applications program or web browser. In one embodiment, the print request initiates an interrupt to the hardware, illustratively, a processor in a file server, workstation, or other computing device, to permit the workstation 102 to temporarily suspend other tasks, while the processor 105 performs the print task requested by the interrupting device. The print medium formatting program 124 monitors for print requests by intercepting the print interrupts to the processor 105. In step 608, the print medium formatting program 124 determines if a print request has been made. If in step 608, the determination is affirmatively answered, the method 600 proceeds to step 610. Otherwise, the method 600 continues to monitor for print requests in step 606. In step 610, the print medium formatting program 124 opens a spooled print file generated by the print request. In particular, the operating system and/or print drivers create a temporary spooled print file for each print request. The spooled print file contains data information and print options that correspond to the type of application program and/or destination output device from where the print request originated. For example, a print request originating from Microsoft's WORD® application program contains data information identifying the contents of the spooled print file as a WORD® document, the output device (e.g., printer), and the like. Once the spooled print file is opened by the print medium formatting program 124, and the method 600 proceeds to step 612.

In step 612, the print medium formatting program 124 compares the data identification of the opened spooled print file with the selected data identification fields stored in the current print configuration data file 212. For example, if the current settings in the open print configuration data file 212 include Printer-2, User-1, and Microsoft's EXPLORER® (see FIG. 4), then the method 600 checks that the data identification in the spooled print file matches the selected output device Printer-2, User-1, and Microsoft's EXPLORER®. If, in step 612, the print data identification does not match the spooled print file, then the method 600 proceeds to step 606 and continues to monitor for new print requests. If, however, the print data identification does match the spooled print file, then the method 600 proceeds to step 614.

In step 614, the exemplary GUIs of FIGS. 4 and 5 are displayed to the user. Optionally, the user may check off a box 409 that instructs the print option formatting module 210 not to automatically display the pop-up-windows GUI 400 and 500. In step 614 (drawn in phantom), the user is given the option to either accept the current settings shown in the GUIs 400 and 500, or make changes therein. Specifically, the user is given the option to either accept or change the current identification data settings (FIG. 4) and print options (FIG.5). Once in step 614, the user accepts "as is," or in the alternate, edits and then accepts the current identification data or printer options, the method 600 proceeds to step 618. In step 618, the transformation program module 216 is executed. The transformation program module 216 transforms the spooled print file in accordance with the current print options (see FIG. 5) as selected in the current print configuration data file 212. The execution of the transformation program module 216 in step 618 is discussed below in further detail with regard to FIG. 7. Once the transformation program module transforms the requested print data in accordance to the selected print options, in step 620, the user requested content (e.g., web page) is printed on the selected output device 140 (e.g., Printer2 in FIG. 5), and the method 600 proceeds to step 622. In step 622, the print configuration data file is closed and the temporary spooled print file is deleted, and in step 624, the method 600 ends.

It is noted that in step 616, if a user edits and saves the current print configuration data file 212, then such changes are permanent to that particular configuration data file 212, until the user manually makes new changes. Further, it is noted that if in step 616, the user selects a different configuration name or creates a new configuration name 408, then the print medium formatting program 124 identifies such changed or new configuration data file 212 as the new current print configuration data file 212 for subsequent print requests. As such, method 600 initially loads the print medium formatting program 124 upon boot-up, thereby making the program's features available immediately to the user. Additionally, it is noted that the user may access the print medium formatting program 124 upon initiating a print request, or at any time "on-the-fly", by illustratively pressing an icon, a sequence of hot-keys, and the like.

Figure 7:
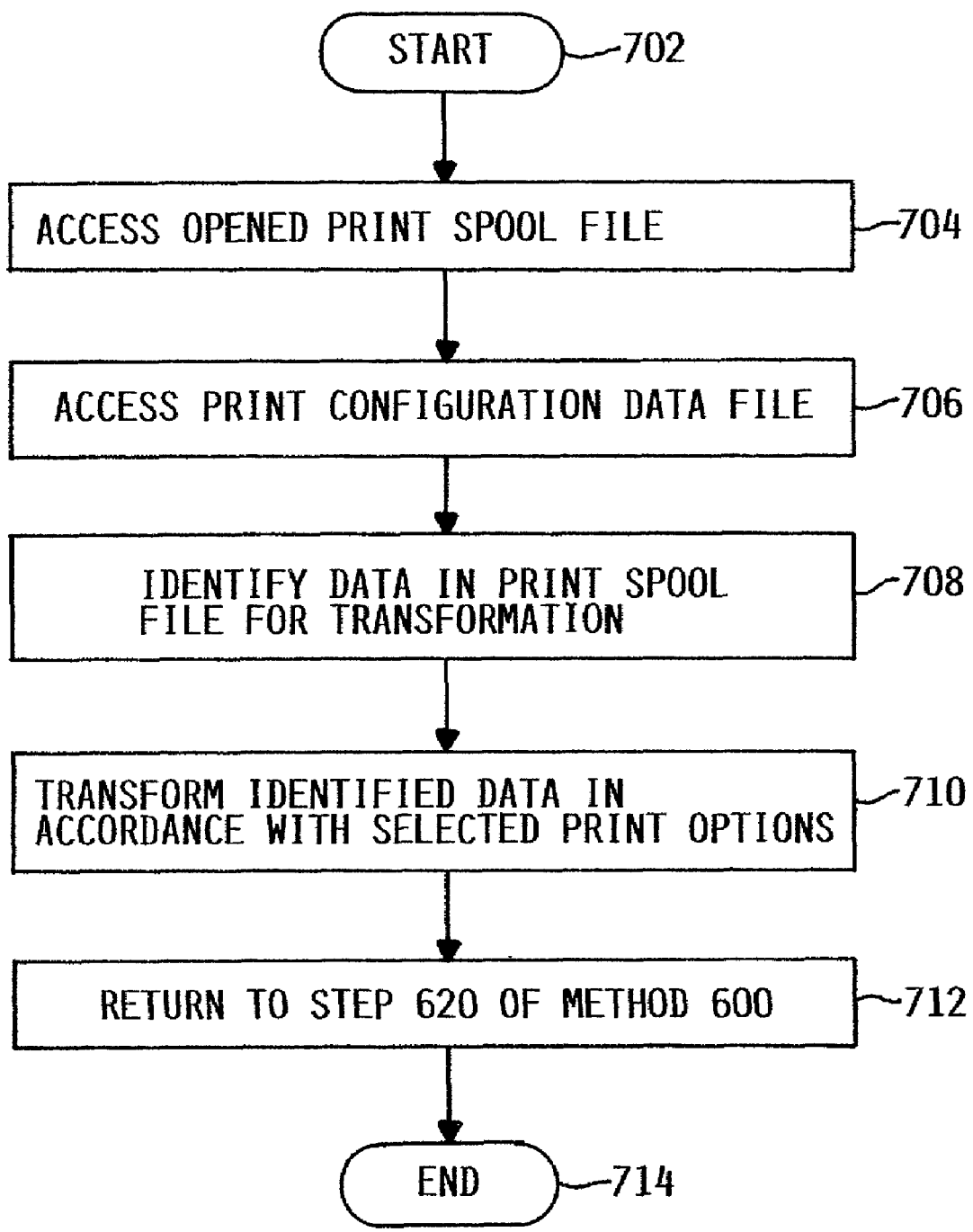
FIG. 7 depicts a flowchart of a method for transforming print requests into printable subject matter in accordance with selected print options of the present invention.

Furthermore, recall that during step 618 of method 600, the transformation program module 216 is executed to transform (i.e., change) the contents of the spooled print data file in accordance with the selected print options (e.g., resolution, size, and the like) stored in the current print data configuration file 212. FIG. 7 depicts a flowchart of a method 700 for transforming print requests into printable subject matter in accordance with selected print options of the present invention. The method 700 starts in step 702, and then proceeds to step 704, where the opened spooled print file is accessed. In step 706, the current print configuration data file 212 is accessed, and in step 708, the specific print data containing content that is to be transformed (e.g., advertisement content, solid background, and the like) is identified for transformation in accordance with the print option settings (e.g., FIG. 5) in the current print configuration data file 212.

In step 710, the transformation program module 212 of the print medium formatting program 124 transforms the identified content in the spooled print file as specified in the current print options. The transformation program module 212 performs the transformation of specific content by any manner known in the art, such as by parsing the print data stream for specific data sequences as identified in the configuration data file 112 and modifying the data stream to reflect the desired print options. Once the identified content in the print spool file or print stream has been transformed, the method 700 proceeds to step 712. In step 712, the method returns to step 620 of method 600 as discussed above. That is, the transformed print spool file is printed by the output device 140 (e.g., Printer2) as specified in the current print configuration data file 212, and in step 714, the method 700 ends.

It should be noted that in step 710, the transformation program module 212 may perform such transformation on the spooled print file previously opened in step 610 of method 600, which was generated by the operating system and/or print drivers as discussed above. Alternately, in step 710, the transformation program module 212 may create a second spooled print file, which contains the transformed print content. In this latter instance, the original spooled print file opened in step 610 is simply deleted. In any case, only one spooled print file containing the transformed print content is retained for subsequent delivery to the output device 140.

The inventive print medium formatting program 124 provides a user or group of users the ability to select graphical and/or textual content, for example, on a web page, for subsequent printing. Furthermore, the print medium formatting program 124 provides options, which allow the user to reduce the consumption of consumable print mediums such as toner, ink cartridges, ink coated ribbons, paper, and the like. By selecting print options that reduce the consumption of the consumable print mediums, additional cost savings may be realized. Moreover, increased productivity may also be realized because of the time saved by not having to print or read irrelevant or undesired content, and the potential benefit of faster printing.

Although several preferred embodiments that incorporate the teachings of the present invention have been shown and described in detail, those skilled in the art may readily devise many other varied embodiments that still incorporate these teachings.

What is claimed is:

1. A computer-readable medium comprising a print medium formatting program which, when executed by a processor, causes the processor to perform an operation for controlling printable content from textual and graphical sources in a computer system, the operation comprising:
    monitoring for a print request;
    intercepting a print file generated by a printer driver from the print request;
    matching the print file with stored identification data; and
    in response to matching the print file with the stored identification data, transforming the printable content in the print file in accordance with stored print options; whereby the transformed print file produces a printed output different from a printed output that would have been produced by the print file generated by the printer driver, and wherein the printable content that is transformed is selected from at least one of banners, advertisements, solid background, user highlighted content and any combination thereof.

2. The computer-readable medium of claim 1, wherein the print medium formatting program, comprises:
    at least one print configuration data file configured to store the identification data and print options;
    a print monitoring module configured for monitoring the print request; and
    a transformation program module configured for transforming the print file, wherein the transformation comprises reducing print resolution and removing at least the transformed printable content.

3. The computer-readable medium of claim 2 wherein the matching step further comprises:
identifying identification data in the print request; and
comparing said identification data in the print request to the stored identification data in a currently selected print configuration data file.

4. The computer-readable medium of claim 1 further comprising printing the transformed print file to an output device selected from the group consisting of a printer, a copier, and a scanner.

5. The computer-readable medium of claim 1 wherein the stored identification data and print options are user configured.

6. The computer-readable medium of claim 1 wherein prior to the monitoring step, the operation further comprises the step of receiving the identification data and print options from a graphical user interface generated by a print option formatting module.

7. The computer-readable medium of claim 6 wherein the receiving step further comprises selecting a current print configuration data file from a listing of at least one print configuration data file.

8. The computer-readable medium of claim 1, wherein prior to the transforming step, the print file is configured by print drivers.

9. A computer system configured to control printable content from textual and graphical sources, comprising:
a memory containing a print medium formatting program;
a processor, which when configured by the print medium formatting program performs an operation comprising:
monitoring for a print request;
intercepting a print file generated by a printer driver from the print request;
matching the print file with stored identification data; and
in response to matching the print file with the stored identification data,
transforming the printable content in the print file in accordance to print options;
whereby the transformed print file produces a printed output different from a printed output that would have been produced by the print file generated by the printer driver, and wherein the printable content that is transformed is selected from at least one of banners, advertisements, solid background, user highlighted content and any combination thereof.

10. The computer system of claim 9 wherein the processor is configured to execute a print command to print the transformed print file to at least one output device coupled to the computer system.

11. The computer system of claim 10 wherein the at least one output device is a device selected from the group consisting of a printer, a copier, and a scanner, and wherein the transformation is performed only when an ink level used by the at least one output device is below a threshold value.

12. The computer system of claim 9 wherein the print medium formatting program is loaded and accessible from a program selected from the group consisting of an operating system, a device driver, and an applications program.

13. The computer system of claim 9 wherein the print medium formatting program further comprises:
at least one print configuration data file configured to store the identification data and the print options;
a print monitoring module configured for monitoring the print request; and
a transformation program module configured for transforming the print file.

14. The computer system of claim 9 wherein the identification data comprises at least one print configuration data file, the at least one output device, and at least one applications program.

15. The computer system of claim 9 wherein the print options include selectable print color, resolution, size, pages per page, and the printable content.

16. The computer system of claim 9 wherein the removed portion of the printable content is selected from at least one of text only, headers, banners, advertisements, solid background, and user highlighted content.

17. A method for controlling printable content from textual and graphical sources, comprising:
receiving first identification data and print options;
storing the first identification data and print data in a print configuration data file derived from the received first identification data and print options;
identifying a print request from a user;
intercepting a print file generated by a printer driver from the print request;
determining whether second identification data in the print file matches the first identification data in the print configuration data file; and
if the second identification data in the print file matches the first identification data in the print configuration data file:
displaying at least one graphical user interface (GUI);
accepting selections in the at least one GUI; and
transforming the matched print file in accordance with the first identification data and print data in the print configuration data file, whereby the transformed print file produces a printed output different from a printed output that would have been produced by the print file generated by the printer driver, and wherein the printable content that is transformed is selected from at least one of banners, advertisements, solid background, user highlighted content and any combination thereof.

18. The method of claim 17 wherein the received first identification data and print options are configured by a user via said at least one GUI and wherein the transformation is one of reducing the print resolution and removing a portion of the printable content.

19. The method of claim 17 wherein said displaying step further comprises at least one of the steps selected in the group consisting of: creating a new print configuration data file, editing an existing print configuration data file, deleting an existing print configuration data file, and accepting a current print configuration data file.

20. The method of claim 17 further comprising printing the print file on at least one output device.

21. The method of claim 20 wherein the at least one output device is a device selected from the group consisting of a printer, a copier, and a scanner, and wherein the transformation is performed only when an ink level used by the at least one output device is below a threshold value.

22. The method of claim 17 wherein the printable content consists of one or more images and the print file is a spooled print file.

23. The computer-readable medium of claim 1, wherein the print file is matched only if identification data in the print file matches stored identification data correspond to one or more user identified parameters comprising specified output devices for printing the print file, specified application programs and specified uniform resource locators.

* * * * *